US008554282B2

(12) United States Patent
Chang

(10) Patent No.: US 8,554,282 B2
(45) Date of Patent: Oct. 8, 2013

(54) METHODS, DEVICES AND COMPUTER PROGRAM PRODUCTS FOR PRESENTING SCREEN CONTENT

(75) Inventor: Paul Chang, Taipei (TW)

(73) Assignee: American Megatrends, Inc., Norcross, GA (US)

( * ) Notice: Subject to any disclaimer, the term of this patent is extended or adjusted under 35 U.S.C. 154(b) by 303 days.

(21) Appl. No.: 12/896,007

(22) Filed: Oct. 1, 2010

(65) Prior Publication Data
US 2012/0083259 A1 Apr. 5, 2012

(51) Int. Cl.
H04B 1/38 (2006.01)
(52) U.S. Cl.
USPC .......................... 455/566; 455/41.2; 455/41.3
(58) Field of Classification Search
USPC ........................................ 455/566, 41.2, 41.3
See application file for complete search history.

(56) References Cited

U.S. PATENT DOCUMENTS

| 5,940,387 | A | 8/1999 | Humpleman |
| 7,046,134 | B2 | 5/2006 | Hansen |
| 7,970,436 | B1 | 6/2011 | Katzer et al. |
| 8,219,028 | B1 * | 7/2012 | Flamholz ..................... 455/41.2 |
| 2002/0018117 | A1 | 2/2002 | Tosaya |
| 2003/0001883 | A1 | 1/2003 | Wang |
| 2004/0049797 | A1 | 3/2004 | Salmonsen |
| 2006/0077310 | A1 | 4/2006 | Wang et al. |
| 2006/0085753 | A1 | 4/2006 | Vance et al. |
| 2006/0203758 | A1 | 9/2006 | Tee et al. |
| 2007/0004387 | A1 * | 1/2007 | Gadamsetty et al. ...... 455/414.1 |
| 2007/0226363 | A1 | 9/2007 | Nishizawah et al. |
| 2007/0243907 | A1 | 10/2007 | Jin et al. |
| 2008/0194196 | A1 * | 8/2008 | Angelhag et al. ............ 455/3.06 |
| 2009/0203403 | A1 | 8/2009 | Gidron et al. |
| 2009/0225688 | A1 | 9/2009 | O'Neill |
| 2009/0305681 | A1 | 12/2009 | Adkins |
| 2010/0068990 | A1 | 3/2010 | Choyi et al. |
| 2010/0211769 | A1 | 8/2010 | Shankar et al. |
| 2010/0621176 | | 8/2010 | Subramonian et al. |
| 2010/0257238 | A1 | 10/2010 | Jeon et al. |
| 2010/0302141 | A1 | 12/2010 | Subramonian et al. |
| 2010/0331082 | A1 * | 12/2010 | Kim et al. ....................... 463/30 |
| 2012/0210376 | A1 | 8/2012 | Quigley et al. |

FOREIGN PATENT DOCUMENTS

JP 2007329597 12/2004

OTHER PUBLICATIONS

PCT/US2010/036511—Written Opinion of the Intl Search Authority (Jul. 26, 2010).
U.S. Appl. No. 12/766,218, filed Apr. 23, 2010, Richardson et al.

* cited by examiner

Primary Examiner — Temica M Beamer
(74) Attorney, Agent, or Firm — Parks IP Law LLC; Jennifer P. Medlin, Esq.

(57) ABSTRACT

Screen content from a first telecommunication device, such as a smartphone, is cast wirelessly and received by a second telecommunications device. The received screen content is formatted for presentation on the second telecommunications device. Screen content from among the received screen content may be selected for transmitting to a third telecommunications device. The selected screen content is transmitted to the third telecommunications device for presentation on a virtual screen of the third telcommunications device.

17 Claims, 3 Drawing Sheets

METHODS, DEVICES AND COMPUTER PROGRAM PRODUCTS FOR PRESENTING SCREEN CONTENT

TECHNICAL FIELD

The present disclosure relates generally to telecommunications, and, more particularly, to presenting screen content cast wirelessly from one device on a virtual screen of at least one other device.

BACKGROUND

Today's smart wireless cellular telephones ("smartphones") are typically equipped with memory and processing capabilities that allow this category of devices to provide significant functionality. For instance, today's smartphones typically provide functionality for sending and receiving electronic mail messages ("e-mail"), browsing the World Wide Web ("the Web"), interacting with social networking services, capturing and viewing digital photographs, and for performing other functions. Some devices are also configured with functionality for viewing slide presentations such as those created with the MICROSOFT POWERPOINT slide presentation application.

Although smartphones may provide functionality for viewing visual content like digital photographs and slide presentations, these devices are generally not utilized to share content or to present this type of content to groups of people. Smartphones typically have small display screens that make sharing visual content with more than a few other people inconvenient at best. Moreover, smartphones are typically not equipped with an external video output for connection to a projector or other type of external display device. As a result, smartphone users that want to share visual content with a group of people are typically required to use another device that is equipped with an external video output, such as a desktop or laptop computer, to output the content to an external display device. This can be inconvenient and impractical in some situations, such as for users that travel significantly and do not want to carry multiple devices.

It is with respect to these and other considerations that the disclosure presented herein has been made.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to one embodiment, a method for presenting information on a virtual screen comprises receiving screen content cast wirelessly from a first telecommunications device, formatting the received screen content for presentation on a second telecommunications device, and presenting the formatted received screen content from the first communication device on a virtual screen of the second telecommunications device. The method further comprises selecting screen content from among the received screen content for transmitting to a third telecommunications device and transmitting the selected screen content to the third telecommunications device for presentation on a virtual screen of the third telecommunications device.

According to another embodiment, a device presents information on a virtual screen. The device includes a transceiver for receiving screen content cast wirelessly from a first telecommunications device. The device further includes a processor for formatting the received screen content for presentation and a screen for presenting the received screen content from the first telecommunications device on a virtual screen. The processor also selects screen content from among the received screen content for transmitting to a second telecommunications device, and the transceiver transmits the selected screen content to the second telecommunications device for presentation on a virtual screen of the second telecommunications device.

According to another embodiment, a non-transitory computer program product includes a storage medium upon which instructions are recorded that, when executed by a processor, perform a method for presenting information on a virtual screen. The method includes receiving screen content cast wirelessly from a first telecommunications device. The method further includes formatting the received screen content for presentation on a second telecommunications device and presenting the formatted received screen content from the first telecommunications device on the virtual screen of the second telecommunications device. The method further includes selecting screen content from among the received screen content for transmitting to a third telecommunications device and transmitting the selected screen content to the third telecommunications device for presentation on a virtual screen of the third telecommunications device.

DETAILED DESCRIPTION

Detailed exemplary embodiments are disclosed herein. It must be understood that the embodiments described and illustrated are merely examples that may be embodied in various and alternative forms, and combinations thereof. As used herein, the word "exemplary" is used expansively to refer to embodiments that serve as examples or illustrations. The figures are not necessarily to scale and some features may be exaggerated or minimized to show details of particular components. Specific structural and functional details disclosed herein are not to be interpreted as limiting.

Figure 1:
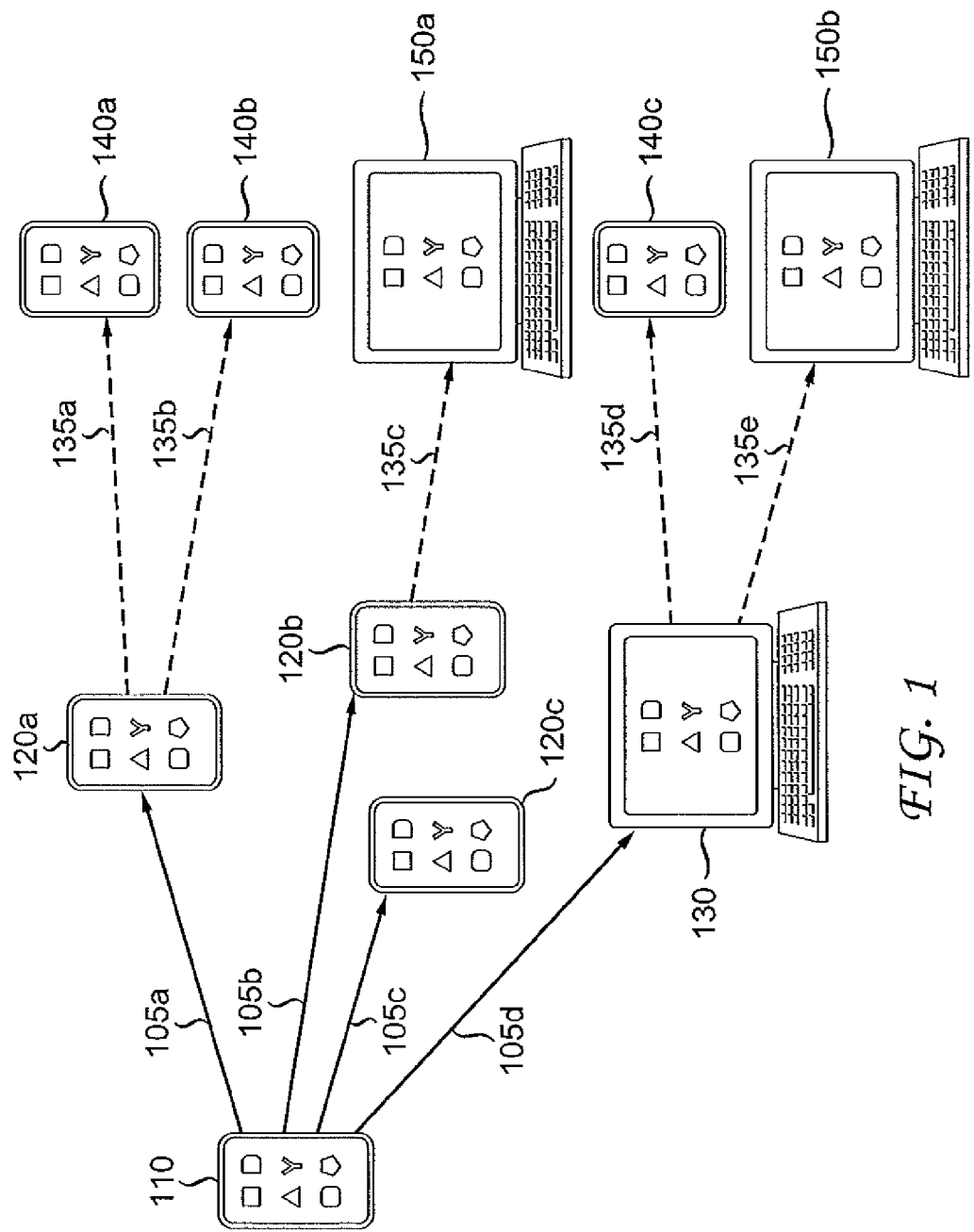
FIG. 1 illustrates an exemplary environment in which a screen cast may be provided for presentation on one or more telcommunications devices.

FIG. 1 illustrates an environment in which screen content of a telecommunication device may be presented according to an exemplary embodiment. Referring to FIG. 1, screen content presented on a telecommunication device, e.g., a smartphone 110, is cast wirelessly to other telecommunication devices, such as smartphones 120a, 120c, and 120b and personal computer 130. The screen content may include static and/or dynamic content including video and/or audio content. The screen content may be encoded based on whether the content is static or dynamic. Also, the screen content may be encrypted, e.g., via real-time encryption or zip encryption, for security.

According to an exemplary embodiment, the encoded and encrypted screen content is cast wirelessly via wireless connections, 105a, 105b, 105c, and 105d. These connections may include, e.g., Bluetooth, WIFI connections, Internet over cellular network connections, such as GPRS, 3G, LTE, etc., or any other wireless connections suitable for transfer of screen content. To provide for casting outside of WIFI range, Wireless Access Point (WAP) mode may be supported.

Screen content may be uploaded over the wireless connections 105a, 105b, 105c and 105d and may be transmitted, e.g., streamed, to other devices 120a, 120b, 120c, and 130 as illustrated in FIG. 1. The received content may be presented in substantially real time on the devices 120a, 120b, 120c and 130. Alternatively, screen content may be transmitted to an intermediate storage device (not shown for simplicity of illustration) for long time preservation and easy access from the Internet. The stored screen content may be retrieved from the memory and transmitted to the devices 120a, 120b, 120c, and 130 at any suitable time, as determined by the device 110 or the devices 120a, 120b, 120c, and 130. As yet another alternative, the received content may be stored in memory in the devices 120a, 120b, 120c and 130 until an appropriate time for presenting the content, which may be determined by users of the devices 120a, 120b, 120c, and 130.

According to one embodiment, casting is performed in one direction, from the device 110 to the devices 120a, 120b, 120c and 130 to ensure secure communications.

According to an exemplary embodiment, the device 110 includes an application for wirelessly casting screen content. The application may be launched, e.g., when the device 110 is turned on or at any other desired time, e.g., responsive to user input. Similarly, each of the devices 120a, 120b, 120c and 130 includes an application for receiving a screencast. The application may be launched when the devices are turned on or at any desired time, e.g., responsive to user input. Once the application is launched, the devices 120a, 120b, 120c and 130 are capable of receiving screencasts from the device 110.

The devices 120a, 120b, 120c and 130 perform any formatting necessary to enable the received screencast to be presented on a virtual screen of each the devices 120a, 120b, 120c and 130. For example, the size/resolution of video content cast from the device 110 may not fit the screen display of devices 120a, 120b, 120e, and 130. Accordingly, the received video content may be resized, or the resolution may be adjusted so that the video content may be displayed on screens of the devices 120a, 120b, 120c, and 130. Also, for screen content including video content and audio content, such formatting may include synchronizing the video content and the audio content. In addition, the devices 120a, 120b, 120c and 130 decode and decrypt the received content, as appropriate. Once formatting, decryption and decoding are performed, the screen content may be presented on virtual screens of the devices 120a, 120b, 120c, and 130.

According to one embodiment, the devices 120a, 120b, 120c and 130 select screen content to be transmitted to other devices 140a, 140b, 140c, 150a and 150b. To conserve processing resources, the devices 120a, 120b, 120e and 130 may relay the screen content in its original encrypted and encoded format to the devices 140a, 140b, 140c and 150. However, some part of the header information that comes along with the screen cast received from the device 110 may be added or taken out by the devices 120a, 120b, 120c and 130, e.g., for advertising or safety/security reasons.

According to exemplary embodiments, the screen content (encrypted or decrypted) is cast wirelessly over connections 135a, 135b, 135d, and 135e. The connections may include connections similar to 105a, 105b, 105c and 105d, e.g., radio frequency broadcast, wireless Internet connections, WAP mode, etc. Devices within the RF reception region or with established TCP/IP connections, such as devices 140a, 140b, 140d, 150a and 150b, receive the transmitted screen content and format, decode and decrypt the transmitted selected screen content as appropriate to prepare it for presentation, in a manner similar to that described above with respect to devices 120a, 120b, 120c and 130.

Although three mobile devices 120a, 120b, and 120c and one desktop device 130 are shown in FIG. 1 as examples of devices for receiving the screen content from the smartphone 110, it should be appreciated that the smartphone 110 may cast screen content to any number or type of devices capable of receiving screen content and transmitting selected screen content to other devices. For example, the screen content may be cast to a transceiver that does not present the received content but is capable of transmitting the screen content to other devices.

Further, although four mobile device 140a, 140b and 140c and two desktop devices 150a and 150b are shown as examples of devices for receiving selected screen content, it should be appreciated that any number or type of devices capable or receiving the selected screen content may be implemented. Further, theses devices may select subsets of the received selected content to transmit to other devices in a manner similar to that described above.

Figure 2:
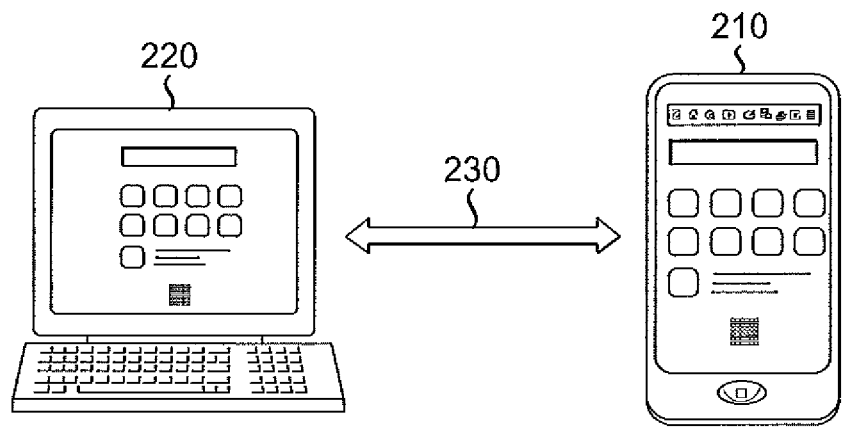
FIG. 2 illustrates a detailed example of how a screen cast is presented on a virtual screen of a telcommunications device.

FIG. 2 illustrates a detailed example of how screen content displayed on a smartphone 210 may be transmitted to a device, such as a personal computer 220, via a wireless connection 230 such as those described above with reference to FIG. 1. As shown in FIG. 2, the screen content may be presented on a virtual screen of the personal computer 230 in substantially real time. According to an exemplary embodiment, there may be a minimal lag (e.g., around a second) between transmission of the screen content and presentation of the screen content. This lag depends mainly on processor speed of the smartphone 210 to compress/send the screen content, and the connection speed between the devices 210 and 220. In FIG. 2, the screen content shown as being displayed on the virtual screen of the personal computer 230 appears virtually the same as it does on the smartphone 210. Although not depicted in FIG. 2, it should be appreciated that the "screen content" may also include audio data that may be presented, e.g., played, in conjunction with presentation, e.g., display, of the video data. Examples of screen content that may be transmitted from the smartphone 210 and presented on the device 220 include but are not limited to a static screen shot, a webcam feed, text/ecard/chat, a whiteboard, a file, a movie, etc. It should be appreciated that the example shown in FIG. 2 is given for illustrative purposes, and that the device 210 is not limited to a smartphone, and the device 230 is not limited to a personal computer.

Figure 3:
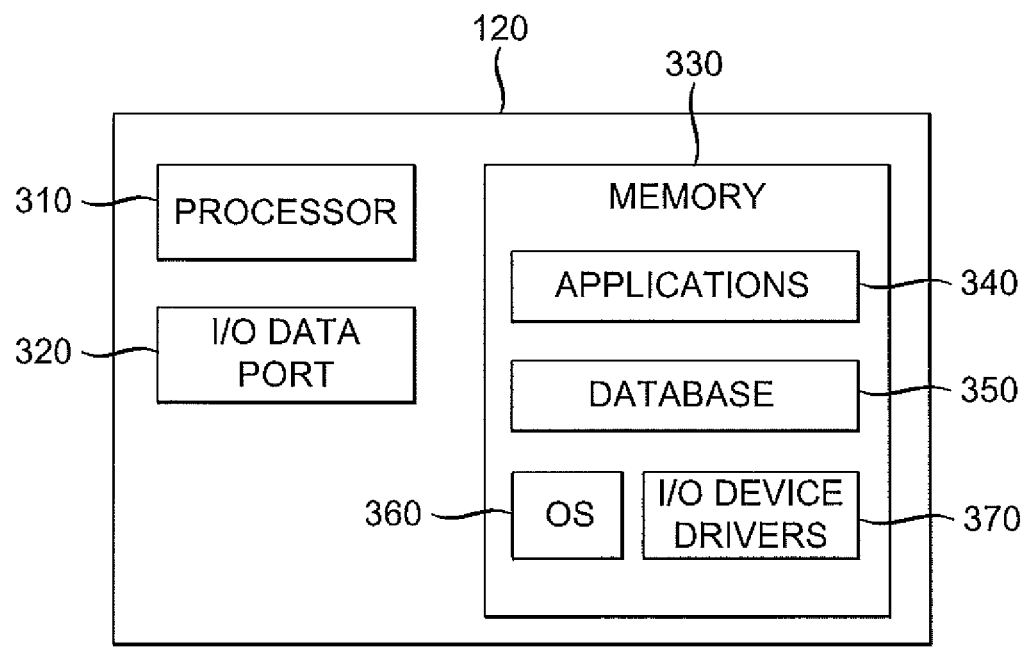
FIG. 3 illustrates a telcommunications device for presenting a screencast received from another telcommunications device, according to an exemplary environment.

FIG. 3 is a block diagram of a device for presenting screen content cast from a telcommunications device, e.g., the smartphone 110, according to an exemplary embodiment. The device 300 may be implemented, e.g., in any and each of the telcommunications devices 120a, 120b, 120c, 130, 140a, 140b, 140c, 150a and 150b. According to an exemplary embodiment, the device 300 includes a processor 310 that receives screen content from, e.g., a smartphone 110, via I/O Data Ports 320. The I/O Data Ports 320 can be implemented with, e.g., an interface including an antenna or other suitable type of transceiver through which data and signals may be transmitted and received wirelessly. It should be appreciated that the I/O Data Ports 320 can be used for communications between a device, such as a smartphone, and various telcommunications devices via wireless connections, such as those shown in FIG. 1.

The processor 310 communicates with the memory 330 via, e.g., an address/data bus. The processor 310 can be any commercially available or customer microprocessor. The memory is 330 is representative of the overall hierarchy of memory devices containing the software and data used to implement the functionality of the device 300. The memory 330 can include but is not limited to the following types of devices: processor registers, processor cache, RAM, ROM, PROM, EPROM, EEPROM, flash memory, SRAMD, DRAM other volatile memory forms, and non-volatile, semi-permanent or permanent memory types; for example, tape-based media, optical media, solid state media, hard disks, combinations thereof, and the like.

As shown in FIG. 3, the memory 330 may include several categories of software and data used in the device 300, including, applications 340, a database 350, an operating system (OS) 360, and the input/output (I/O) device drivers 370. As will be appreciated by those skilled in the art, the OS 360 may be any operating system for use with a data processing system. The I/O device drivers 370 may include various routines accessed through the OS 360 by the applications 340 to communicate with devices, and certain memory components. The applications 340 can be stored in the memory 330 and/or in a firmware (not shown) as executable instructions, and can be executed by the processor 310. The applications 340 include various programs that implement the various features of the device 300, including, e.g., applications for formatting, decoding and decrypting received screen content to apply to data received via the I/O data ports 320 to generate screen content for presentation by the processor 310. According to an exemplary embodiment, the applications may also include modules for executing a smartphone operating system and smartphone applications on non-smartphone hardware as described in co-pending and commonly assigned U.S. patent application Ser. No. 12/706,392 filed Feb. 16, 2010 and hereby incorporated by reference. The database 350 represents the static and dynamic data used by the applications 340, the OS 360, the I/O device drivers 370 and other software programs that may reside in the memory. The database 350 may store received screen content for presentation. Also, the database 350 may store data for use in presenting the screen content, e.g., decryption codes, channel information, data indicative of the screen resolution, etc.

While the memory 330 is illustrated as residing proximate the processor 310, it should be understood that at least a portion of the memory 330 can be a remotely accessed storage system, for example, a server on a communication network, a remote hard disk drive, a removable storage medium, combinations thereof, and the like. Thus, any of the data, applications, and/or software described above can be stored within the memory 330 and/or accessed via network connections to other data processing systems (not shown) that may include a local area network (LAN), a metropolitan area network (MAN), or a wide area network (WAN), for example.

It should be understood that FIG. 3 and the description above are intended to provide a brief, general description of a suitable environment in which the various aspects of some embodiments of the present disclosure can be implemented. While the description refers to computer-readable instructions, the present disclosure also can be implemented in combination with other program modules and/or as a combination of hardware and software in addition to, or in stead of, computer readable instructions. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

Figure 4:
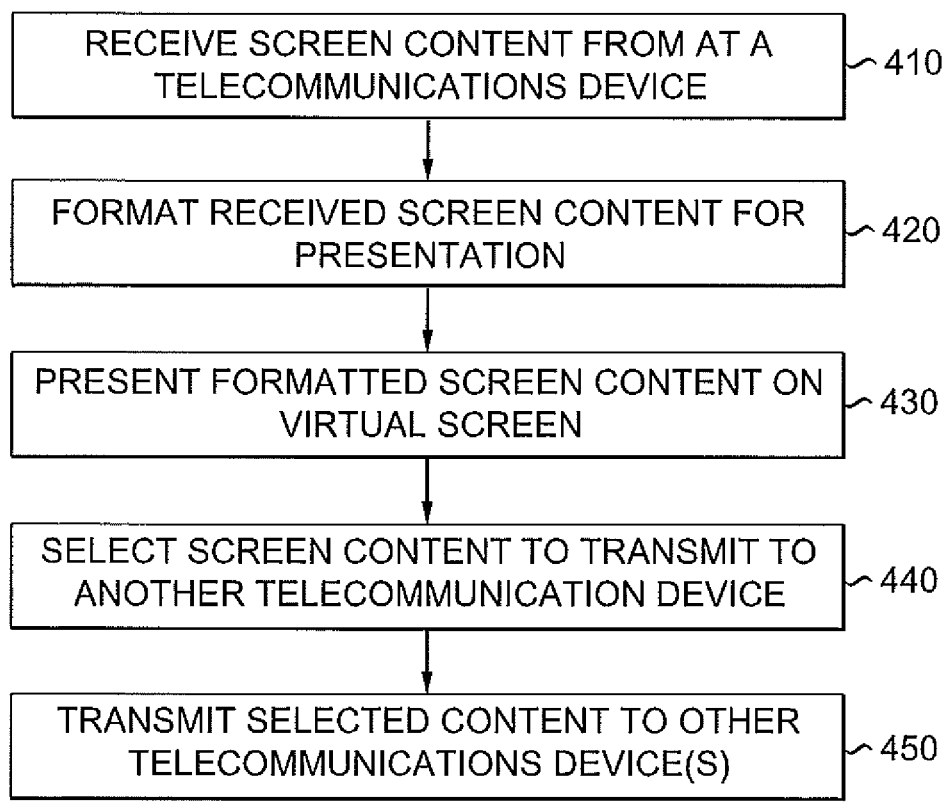
FIG. 4 is a flow chart illustrating a method for presenting screen content received from a telcommunications device on a virtual screen of another telcommunications device.

FIG. 4 is a flow chart illustrating a method for presenting screen content received from a smartphone on a virtual screen of a telcommunications device. Screen content cast from a smartphone, e.g., smartphone 110, is received at step 410 at telecommunications device(s), e.g., devices 120a, 120b, 120c and 130. The screen content may also be content that is selected and transmitted to devices 140a, 140b, 140c, 150a and 150b. The received content is formatted for presentation at step 420. The received content may also be decoded and decrypted, if appropriate. The formatted screen content is presented on a virtual screen in substantially real time at step 430. As an alternative, the screen content may be stored for presentation at a later time, either in an intermediate storage or in memory within the devices 120a, 120b, 120e and 130. At step 440, screen content is selected to transmit to other telecommunications device(s), e.g., devices 140a, 140b, 150a, and 150b. This selection may be performed by the devices 120a, 120b, 120c and 130 automatically or responsive to user input. The selected screen content may be transmitted to the other device(s) at step 450 in substantially real time. As an alternative, the selected screen content may be stored in memory within the devices 120a, 120b, 120c and 130 and transmitted to the devices 140a, 140b, 150a and 150b at a later time.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method for presenting screen content, comprising:
receiving screen content presented on a screen of a first telecommunication device at a second telecommunication device, wherein the screen content is cast wirelessly from the first telecommunication device directly to the second communication device, and wherein the first telecommunication device is a smartphone;
formatting the received screen content for presentation on at the second telecommunications device; and
presenting the formatted received screen content for display on a virtual screen of the second telecommunications device, such that the received content appears on the virtual screen of the second telecommunications device virtually the same as the screen content appears on the screen of the first telecommunications device.

2. The method of claim 1, wherein the screen content is received, formatted, and presented in substantially real time.

3. The method of claim 1, wherein the second telecommunication device is a smartphone.

4. The method of claim 1, further comprising:
selecting screen content from among the received screen content for transmitting to at least one third telecommunications device; and transmitting the selected screen content to the at least one third telecommunications device for presentation on a virtual screen of the at least one third telecommunications device.

5. The method of claim 1, wherein the selected screen content is received and formatted by the at least one third telecommunication device for presentation on the at least one third telecommunications device.

6. The method of claim 1, wherein the screen content includes at least one of static content and dynamic content, and wherein the static content and dynamic content include at least one of video content and audio content.

7. A device for presenting information, comprising:
a transceiver for receiving screen content from a telecommunication device, wherein the screen content is cast wirelessly from the telecommunication device directly to the transceiver, and wherein the telecommunication device is a smartphone;
a processor: and
a memory having stored thereon instructions which, when executed by the processor, cause the processor to perform operations comprising:
formatting the received screen content for presentation on the device; and
presenting the formatted received screen content from the telecommunication device for display on a virtual screen of the device, such that the received content appears on the virtual screen of the device virtually the same as the screen content appears on the screen of the telecommunications device.

8. The device of claim 7, wherein the screen content is received, formatted, and presented in substantially real time.

9. The device of claim 7, wherein the device is a smartphone.

10. The device of claim 7, wherein the memory further has instructions stored thereon which, when executed by the processor, cause the processor to select screen content from among the received screen content for transmitting to at least one other telecommunications device, and the transceiver transmits the selected screen content to the at least one other telecommunications device for presentation on a virtual screen of the at least one other telecommunications device.

11. The device of claim 7, wherein the received screen content includes at least one of static content and dynamic content, and the static content and the dynamic content include at least one of video content and audio content.

12. A non-transitory computer program product including a storage medium upon which instructions are recorded that, when executed by a processor, cause the processor to perform a method for presenting screen content, the method comprising:
receiving screen content from a first telecommunications device at a second telecommunication device, wherein the screen content is cast wirelessly from the first telecommunication device directly to the second telecommunication device, and wherein the first telecommunication device is a smartphone;
formatting the received screen content for presentation on the second telecommunications device; and
presenting for display the formatted received screen content from the first telecommunications device on a virtual screen of the second telecommunications device, such that the received content appears on the virtual screen of the second telecommunications device virtually the same as the screen content appears on the screen of the first telecommunications device.

13. The non-transitory computer program product of claim 12, wherein the screen content is received, formatted, and presented in substantially real time.

14. The non-transitory computer program product of claim 12, wherein the second telecommunication device is a smartphone.

15. The non-transitory computer program product of claim 12, wherein the method further comprises:
selecting screen content from among the received content for transmitting to at least a third telecommunications device; and
transmitting the selected screen content to the at least one third telecommunications device for presentation on a virtual screen of the at least one other telecommunications device.

16. The non-transitory computer program product of claim 12, wherein the selected screen content is received and formatted by the at least one third telecommunication device for presentation on the at least one third telecommunications device.

17. The non-transitory computer program product of claim 12, wherein the received screen content includes at least one of static and dynamic content, and wherein the static content and dynamic content include at least one of video content and audio content.

* * * * *